US007813405B2

(12) United States Patent
Widen et al.

(10) Patent No.: US 7,813,405 B2
(45) **Date of Patent: *Oct. 12, 2010**

(54) UNSTABLE DISK RESONATOR

(75) Inventors: Kenneth Charles Widen, Topanga, CA (US); Harry H. Wang, Newbury Park, CA (US); Gregory A. Needham, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/185,501

(22) Filed: Aug. 4, 2008

(65) Prior Publication Data

US 2010/0027572 A1 Feb. 4, 2010

(51) Int. Cl.
*H01S 3/08* (2006.01)

(52) U.S. Cl. .......................................... 372/92; 372/97

(58) Field of Classification Search .................. 372/95, 372/92, 97, 72

See application file for complete search history.

(56) References Cited

U.S. PATENT DOCUMENTS 6,061,377 A * 5/2000 Brassart et al. ............... 372/66
6,603,793 B2 * 8/2003 Vetrovec ...................... 372/95
6,813,285 B2 * 11/2004 Peterson ...................... 372/10
6,847,673 B2 1/2005 Dane et al.
7,200,161 B2 4/2007 Vetrovec
2002/0172253 A1 11/2002 Vetrovec

FOREIGN PATENT DOCUMENTS

WO 2009095311 8/2009

OTHER PUBLICATIONS

United Kingdom Patent Office—Combined Search and Examination Report under Sections 17 and 18(3) dated Sep. 1, 2009.

* cited by examiner

*Primary Examiner*—Minsun Harvey
*Assistant Examiner*—Tuan Nguyen
(74) *Attorney, Agent, or Firm*—R. Brian Drozd; Moore & Van Allen, PLLC

(57) ABSTRACT

A configuration for an unstable, negative branch imaging resonator (NBIR) is disclosed in which coupling mirrors are added so that the Primary and Secondary mirrors are not in direct optical communication with the imaging systems which minimizes the occurrence of the NBIR experiencing magnification runaway and/or odd order aberrations by using coupling mirrors to provide indirect optical communication between the imaging systems and the Primary and Secondary end mirrors.

18 Claims, 2 Drawing Sheets

30
40 41 42 43 44 45 46 47 48 49
D1 D2 D3 D4 D5 D6 D7 D8 D9 D10
SECONDARY MIRROR
34
MIRROR 36
SYMMETRY AXIS
50
38
MIRROR
M1 M2 M3 M4 M5 M6 M7 M8 M9 M10
32
PRIMARY MIRROR

UNSTABLE DISK RESONATOR

CROSS REFERENCE TO RELATED APPLICATIONS

Some of the subject matter disclosed in this application is disclosed and claimed in a commonly owned, co-pending patent application of the same assignee, entitled UNSTABLE RESONATOR FOR DISK LASERS, filed as U.S. patent application Ser. No. 12/109,634 by Dale A. Holmes on Apr. 25, 2008.

BACKGROUND OF THE DISCLOSURE

This disclosure relates to unstable laser resonators, and more particularly to unstable laser disk resonators.

The above cross-referenced patent application, which is fully incorporated herein by reference, discloses an unstable laser disk resonator capable of providing a high power, near diffraction limited laser signal that is suitable for precise laser applications. The high power signal is achieved by disposing a plurality of 1:1 laser disk imaging systems in a cascaded arrangement along the optical axis of the resonator cavity; between the cavity's Primary and Secondary (feedback) mirrors. Each of the 1:1 imaging systems includes comprise two optical elements, such as a laser disk and a reflecting mirror, which is also referred to as a relay mirror, or two laser disks.

The optical elements of each 1:1 imaging system are disposed in a confocal relationship on opposite sides of a virtual symmetry axis that runs through their common focal point. The elements are also positioned in a mutually oblique relationship such as to provide the cascaded imaging systems in a "W" configuration along the symmetry axis. This allows for full self imaging of each laser disk output signal onto each adjoining laser disk to achieve a high power laser output.

The referenced unstable imaging laser resonator may be embodied as either a positive branch or a negative branch resonator to provide either a positive branch imaging resonator (PBIR) or a negative branch imaging resonator (NBIR). The NBIR has the advantage of being less alignment sensitive and it naturally compensates for system astigmatism due to its odd number of lasing signal foci. This allows greater flexibility in interchanging the positions of the laser disk and the reflecting mirror within the imaging system, and it also makes it possible to replace the reflecting mirror with a laser disk so that both optical elements of the 1:1 imaging system may be laser disks.

The NBIR embodiment of the referenced unstable imaging laser resonator employs a standard end-mirror placement in which the Primary and Secondary end mirrors are in direct optical communication with opposite end ones of the plurality of cascaded 1:1 imaging systems. The Primary mirror receives the return path laser signal directly from the 1:1 imaging systems and the Secondary mirror also receives the forward path laser signal directly from the 1:1 imaging systems. The Secondary mirror couples a portion of the forward path laser signal out of the cavity and reflects the remainder to the imaging systems to establish the feedback propagation of the resonant laser signal. The imaging system laser disks have an active medium, such as Yb:YAG (ytterbium-doped yttrium aluminum garnet), which is excited by a pumping light from a diode laser array. The pumped laser light restores the energy to the disk medium that is extracted from the lasing light. This allows the laser disk to provide a greater than unity gain at the laser wavelength, and function as an active mirror.

Although the prior art NBIR is less alignment sensitive, and naturally compensates for system astigmatism, all high-power laser resonators have residual aberrations that can occur with random physical displacement of the NBIR optical elements, or from variations in the pumped laser excitation of the laser disk medium. Prior art methods for correcting and/or compensating for these aberrations include the use of closed-loop multiple-actuator deformable mirrors. These corrective systems, however, are both complex and expensive. In addition, there are no current actuated mirror mount designs that are capable of correcting for odd order aberrations, such as comatic aberrations, or "coma". It is desirable, therefore, to find a method or apparatus which can suppress all aberrations, including such odd order aberrations.

BRIEF SUMMARY OF THE DISCLOSURE

The present disclosure is to a method and apparatus for an improved unstable, laser disk, negative branch imaging resonator (NBIR) to minimize the occurrence of odd order aberrations.

According to the present disclosure, an improved unstable, laser disk, negative branch imaging resonator (NBIR) apparatus includes: an optical cavity having an optical axis; Primary and Secondary end mirrors disposed at opposite ends of the optical axis, and one or more 1:1 laser disk imaging systems disposed in cascade along the optical axis, between the end mirrors, including a first imaging system disposed adjacent to the Secondary mirror and a last imaging system disposed adjacent the Primary mirror, each imaging system including a laser disk and a reflecting mirror disposed in a confocal relationship to provides full self imaging of each 1:1 imaging system output signal onto an adjoining imaging system; and one or more coupling mirrors disposed between the optical elements of the imaging system and the Secondary and Primary mirrors, to provide indirect optical communication therebetween.

In further accord with the disclosure there are an equal number of coupling mirrors disposed between the imaging systems and the Secondary and Primary end mirrors. In still further accord with the disclosure, the number of coupling mirrors disposed between the imaging systems and each of the Secondary and Primary end mirrors is selected to maintain the NBIR performance of the unstable laser disk resonator. In yet still further accord with the present disclosure there is one coupling mirror each that is disposed between the imaging systems and the Secondary mirror and the Primary mirror.

According to the present disclosure a method for minimizing odd order aberration in an unstable laser disk resonator of the type having Primary and Secondary end mirrors disposed at opposite ends of the optical axis of a resonator cavity, and one or more 1:1 laser disk imaging systems disposed in cascade along the optical axis, between the end mirrors, including a first imaging system disposed adjacent to and in direct optical communication with the Secondary mirror and a last imaging system disposed adjacent to and in direct optical communication with the Primary mirror, the imaging systems in combination with the end mirrors providing a negative branch imaging resonator (NBIR), each imaging system including a laser disk and a reflecting mirror, each having a concave spherical mirror surface, and together disposed in a confocal, mutually oblique relationship as a W configuration array to provide full self imaging of each 1:1 imaging system output signal onto an adjoining imaging system, the method comprising eliminating direct optical communication between the 1:1 imaging systems and the Secondary and Primary mirrors by inserting one or more coupling mirrors between the Secondary mirror and the laser disk of the first imaging system, and between the Primary mirror and the reflecting mirror of the last imaging system, thereby providing indirect optical communication between the end mirrors and the 1:1 imaging systems. In further accord with the method of the present disclosure, the number of coupling mirrors inserted between the imaging systems and the end mirrors is selected to maintain the NBIR performance. In still further accord with the method of the present disclosure an equal number of coupling mirrors are added between the imaging systems and the Secondary mirror and the Primary mirror. In yet still further accord with the method of the present disclosure one coupling mirror each is disposed between the 1:1 imaging systems and the Secondary mirror and the Primary mirror.

The present disclosure provides a simple and effective means for minimizing the occurrence of odd order aberrations. Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION OF THE DISCLOSURE

The following detailed description of embodiments refers to the accompanying drawings, which illustrate specific embodiments of the disclosure. Other embodiments having different structures and operations do not depart from the scope of the present disclosure.

Figure 1:
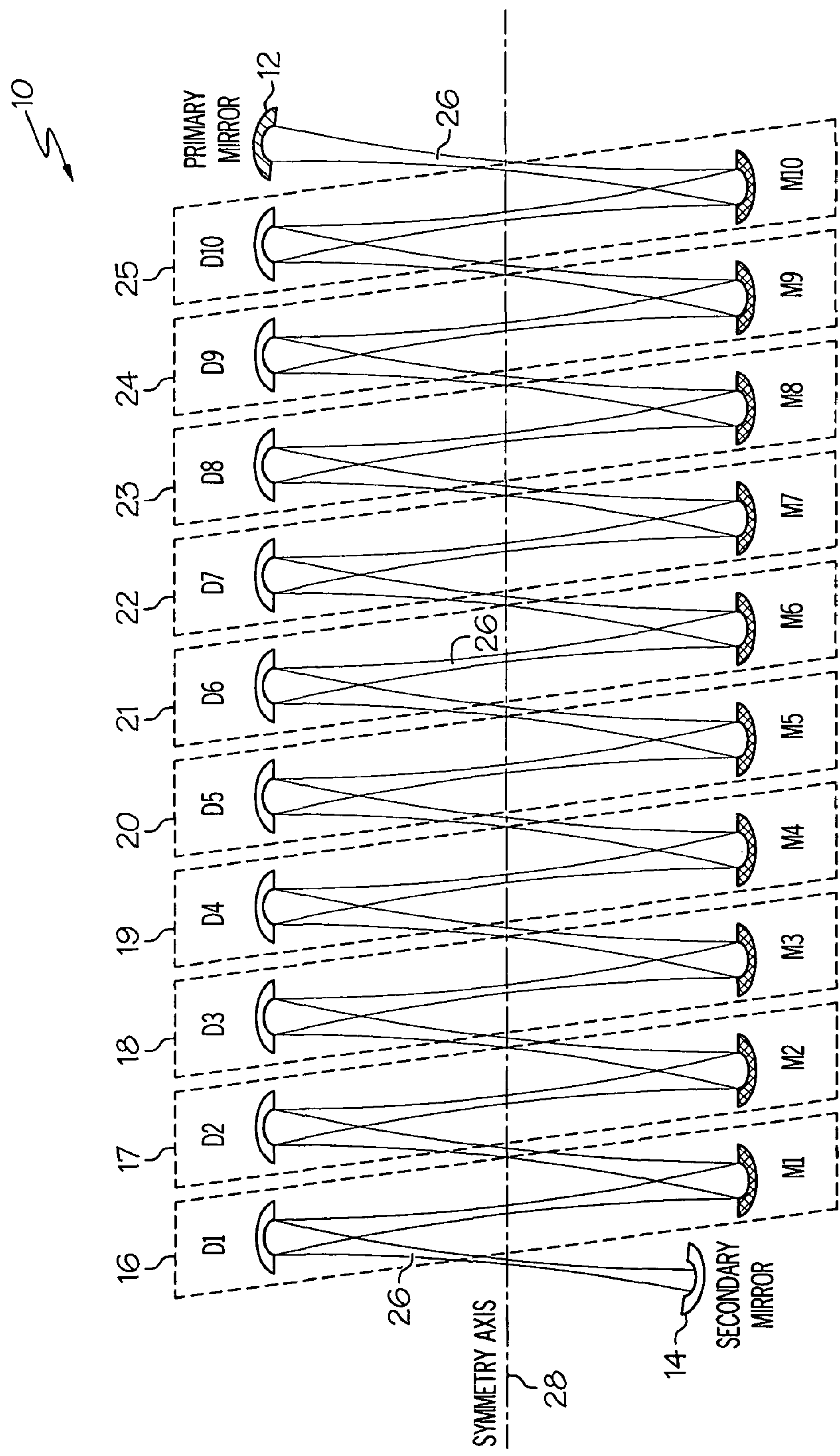
FIG. 1, is a schematic illustration of an exemplary embodiment of an unstable laser disk resonator.

The present disclosure is to the method and apparatus for providing an unstable laser disk resonator NBIR configuration that produces a single, multi kilowatt, transverse mode, near diffraction limited output laser beam, while preventing the formation of odd order aberrations in the output beam. FIG. 1 is a schematic of the above cross-referenced, prior art NBIR unstable laser disk resonator 10. The resonator 10 has a spherical concave Primary mirror 12 and spherical concave Secondary mirror 14 that are positioned at opposite end of a plurality of 1:1 laser disk imaging systems 16-25, with the Primary mirror 12 being adjacent the last imaging system 25 and the Secondary mirror 14 being adjacent the first imaging system 16. The imaging systems 16-25 each comprise a laser disk (D1-D10) disposed in confocal relationship with an associated reflecting mirror (M1-M10). The imaging systems themselves are disposed in cascade along the optical axis 26 of the resonator 10, such that the output laser signal from one imaging system serves as the input signal to the next succeeding imaging system. This occurs in both the forward path propagation (Primary to Secondary mirror) as well as the feedback path propagation (Secondary to Primary). A symmetry axis 28 runs through the locus of the focal points of the confocal imaging systems 16-25.

The D1-D10 laser disks and M1-M10 reflecting mirrors of the imaging systems 16-25 are also positioned in a mutually oblique relationship, in an array pattern known as a "W configuration". The confocal relationship of the laser diodes and reflecting mirrors together with the W configuration array provides full self imaging of each laser disk output signal onto each adjoining laser disk, thereby achieving the high power laser output. In the FIG. 1 embodiment of the NBIR 10 the Primary mirror 12 and Secondary mirror 14 are shown in a "standard end mirror placement" which, as disclosed in the above cross referenced application to Dale A. Holmes, places the end mirrors in direct optical communication with the imaging systems 16-25. As shown, Primary mirror 12 is in direct optical communication with reflecting mirror M10 of the end imaging system 25 and Secondary mirror 14 is in direct optical communication with the laser disk D1 of imaging system 16.

Figure 2:
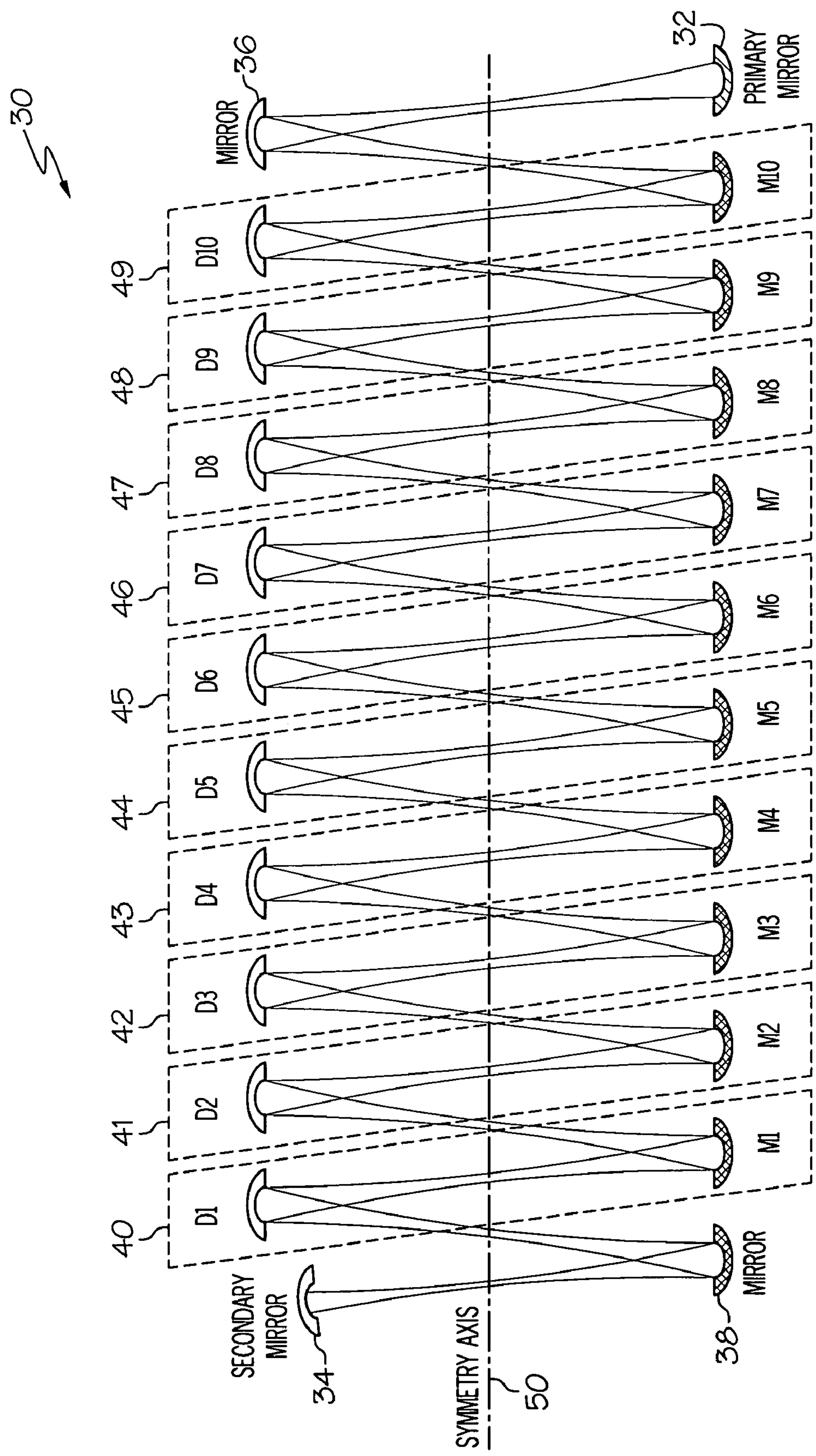
FIG. 2, is a schematic illustration of an exemplary embodiment of an unstable laser disk resonator according to the present disclosure.

The present disclosure provides a simple but novel change to the functional relationship between the imaging systems and the Primary and Secondary end mirrors that permits odd order aberrations such as coma to naturally cancel. It does this by eliminating direct optical communications between the imaging systems and the end mirrors through the addition of coupling mirrors that provide indirect communication. This is shown in the embodiment of FIG. 2 in which an NBIR unstable laser disk resonator 30 includes a spherical concave Primary mirror 32 and spherical concave Secondary mirror 34 which are indirectly optically coupled to a like plurality of imaging systems 40-49 through coupling mirrors 36, 38.

The imaging systems 40-49 are identical to those 16-25 in the embodiment of FIG. 1, as are the spherical concave Primary mirrors 12, 32 and Secondary mirrors 14, 34. The only visible distinction between the FIG. 1 and FIG. 2 NBIR embodiments are the coupling mirrors 36, 38 of the resonator 30 of FIG. 2. With the addition of the coupling mirrors 36, 38 the Primary and Secondary end mirrors are physically relocated to opposite sides of the symmetry axis 50 of FIG. 2 from their original position in respect of symmetry axis 28 of FIG. 1. This gives the visual appearance of "flipping" the end mirrors from their relative positions in the FIG. 1 embodiment and may be referred to conversationally in distinguishing their indirect optical communication with the imaging systems from the direct communication provided by the standard mirror placement.

As known, the NBIR is distinguished by having an odd number of foci in a round trip (i.e. forward and reverse) propagation of the resonant laser signal between the Primary and Secondary end mirrors. In a best mode embodiment of the disclosure only one coupling each is shown between the imaging systems 40-49 and the Primary 32 and Secondary 34 end mirrors. However additional mirrors may be added, as necessary for a given application, as long as the NBIR performance of the resonator 30 is maintained. This can be achieved by adding coupling mirrors equally to each of the end mirrors.

With the improvement provided by the present disclosure, any odd order aberrations, such as coma, that do occur in the resonator will cancel naturally. This is achieved with no added adaptive optical systems to compensate for odd order aberrations. This saves significant amount of technical complexity and cost.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

The invention claimed is:

1. A method for minimizing odd order aberration in an unstable laser disk resonator of the type having an optical cavity with an optical axis, Primary and Secondary end mirrors disposed at opposite ends of the optical axis, and one or more 1:1 laser disk imaging systems disposed in cascade between the Primary and Secondary end mirrors, from a first imaging system disposed adjacent to and in direct optical communication with the Secondary mirror and a last imaging system disposed adjacent to and in direct optical communication with the Primary end mirror, the imaging systems in combination with the end mirrors providing a negative branch imaging resonator (NBIR), each imaging system including a laser disk and a reflecting mirror, each having a concave spherical mirror surface, and together disposed in a confocal, mutually oblique relationship that extends as a W configuration array to provide full self imaging of each 1:1 imaging system output signal onto an adjoining imaging system, the method comprising:

inserting a first single coupling mirror between the Secondary end mirror and the laser disk of the first imaging system, and inserting a second single coupling mirror between the Primary end mirror and the reflecting mirror of the last imaging system at a position in order to maintain NBIR performance characteristics of the unstable laser disk resonator, thereby providing indirect optical communication between the end mirrors and the 1:1 imaging systems, thereby eliminating direct optical communication between the 1:1 imaging systems and the Secondary and Primary end mirrors.

2. The method of claim 1, further comprising:

applying a laser beam to the laser disk resonator.

3. The method of claim 1, wherein the first and second single coupling mirrors are each between the 1:1 imaging systems and one of the Secondary mirror and the Primary end mirror.

4. The method of claim 1, further comprising:

configuring the 1:1 imaging systems and the optical cavity end mirrors to provide a negative branch imaging resonator (NBIR).

5. An unstable laser disk resonator for providing a near diffraction limited output laser signal, comprising:

an optical cavity having an optical axis;

end mirrors, including a Primary end mirror and a Secondary end mirror disposed at opposite ends of the optical axis, for providing unstable resonator oscillation of a laser signal propagating between them;

one or more 1:1 laser disk imaging systems disposed in cascade on the optical axis, between the Secondary and Primary end mirrors, from a first imaging system adjacent to the Secondary mirror to a last imaging system adjacent to the Primary end mirror, the imaging systems in combination with the Secondary and Primary end mirrors providing a negative branch imaging resonator (NBIR), each imaging system including a laser disk and a reflecting mirror, each having a concave spherical mirror surface, and together disposed in a confocal, mutually oblique relationship that extends as a W configuration array to provide full self imaging of each 1:1 imaging system output signal onto an adjoining imaging system;

a first single coupling mirror disposed between the Secondary end mirror and the first imaging system, whereby the Secondary end mirror is not in direct optical communication with the first imaging system; and a second single coupling mirror disposed between the Primary end mirror and the imaging system, whereby the Primary end mirror is not in direct optical communication with the reflecting mirror of the last imaging system at a position in order to maintain NBIR performance characteristics of the unstable laser disk resonator.

6. The unstable laser disk resonator of claim 5, where each coupling mirror is disposed between the 1:1 imaging systems and the Secondary mirror and the Primary end mirrors.

7. The unstable laser disk resonator of claim 5, wherein the spherical mirror surfaces of the laser disks and the reflecting mirrors are positioned in respective laser disk and reflecting mirror image planes that are mutually spaced at a selected image distance over the extent of their disposition along the optical axis.

8. The unstable laser disk resonator of claim 7, wherein the spherical mirror surfaces of the laser disks and the reflecting mirrors have substantially the same radius of curvature.

9. The unstable laser disk resonator of claim 8, wherein the selected image distance between the laser disk and the reflecting mirror image planes is equal to the sum of the focal lengths of the spherical mirror surfaces of the laser disk and associated reflecting mirror.

10. A system for providing a near diffraction limited output laser signal, comprising:

an optical cavity having an optical axis;

end mirrors disposed at opposite ends of the optical axis, including a Primary end mirror and a Secondary end mirror, for providing unstable resonator oscillation of a laser signal propagating between the end mirrors;

laser disks disposed jointly with associated reflecting mirrors, sequentially along the optical axis, the laser disks and reflecting end mirrors each having a concave spherical mirror surface which in combination provide one or more 1:1 imaging systems between the Secondary end mirror and the Primary end mirror, each 1:1 imaging system providing full self imaging of each laser disk signal onto each adjoining laser disk;

a first single coupling mirror disposed between the Secondary end mirror and the first imaging system, whereby the Secondary end mirror is not in direct optical communication with the first imaging system; and a second single coupling mirror disposed between the Primary end mirror and the imaging system, whereby the Primary end mirror is not in direct optical communication with the reflecting mirror of the last imaging system at a position in order to maintain NBIR performance characteristics of an unstable laser disk resonator;

wherein the spherical mirror surfaces of the sequentially disposed laser disks and the reflecting mirrors are positioned in respective laser disk and reflecting mirror image planes that are mutually spaced at a selected image distance over the extent of their disposition along the optical axis, and wherein the optical cavity comprises two or more cavity levels, including a first cavity level having the Secondary end mirror and a last cavity level having the Primary mirror, each cavity level having laser disks and associated reflecting mirrors arranged in W configurations to provide one or more imaging systems thereon.

11. The unstable laser disk resonator of claim 10, wherein the spherical mirror surfaces of the sequentially disposed laser disks and the reflecting mirrors are positioned in respective laser disk and reflecting mirror image planes that are mutually spaced at a selected image distance over the extent of their disposition along the optical axis.

12. The unstable laser disk resonator of claim 11, wherein the spherical mirror surfaces of the disposed laser disks and the reflecting mirrors have substantially the same radius of curvature.

13. The unstable laser disk resonator of claim 12, wherein the selected image distance between the laser disk and the reflecting mirror image planes is equal to the sum of the focal lengths of the spherical mirror surfaces of the laser disk and associated reflecting mirror.

14. The unstable laser disk resonator of claim 13, wherein the focal lengths of the laser disk and associated reflecting mirror spherical mirror surfaces are equal, and each of the 1:1 imaging systems are confocal.

15. The unstable laser disk resonator of claim 14, wherein the associated reflecting mirrors are also laser disks.

16. The unstable laser disk resonator of claim 14, wherein the laser disks and associated reflecting mirrors are arranged in a collective W configuration along the optical axis.

17. The unstable laser disk resonator of claim 14, wherein the 1:1 imaging systems and the optical cavity end mirrors provide a negative branch imaging resonator (NBIR).

18. A system comprising:

an optical cavity having an optical axis;

end mirrors comprising a Primary end mirror and a Secondary end mirror disposed at opposite ends of the optical axis for providing unstable resonator oscillation of a laser signal propagating between the end mirrors;

one or more laser disk imaging systems disposed between the Secondary and Primary end mirrors, the one or more laser disk imaging systems in combination with the Secondary and Primary end mirrors providing a negative branch imaging resonator (NBIR);

a first single coupling mirror disposed between the Secondary end mirror and the first imaging system, whereby the Secondary end mirror is not in direct optical communication with the first imaging system; and a second single coupling mirror disposed between the Primary end mirror and the imaging system, whereby the Primary end mirror is not in direct optical communication with the last imaging system.

* * * * *